(12) United States Patent
Sasano et al.

(10) Patent No.: US 12,090,832 B2
(45) Date of Patent: Sep. 17, 2024

(54) BATTERY INSTALLATION STRUCTURE

(71) Applicant: Honda Motor Co., Ltd., Tokyo (JP)

(72) Inventors: Yamato Sasano, Tokyo (JP); Naoya Sawara, Tokyo (JP); Tomoo Watanabe, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 344 days.

(21) Appl. No.: 17/684,361

(22) Filed: Mar. 1, 2022

(65) Prior Publication Data
US 2022/0314776 A1    Oct. 6, 2022

(30) Foreign Application Priority Data

Mar. 30, 2021    (CN) .......................... 202110343744.3

(51) Int. Cl.
| | | |
|---|---|---|
| *B60K 1/04* | (2019.01) | |
| *H01M 50/204* | (2021.01) | |
| *H01M 50/242* | (2021.01) | |
| *H01M 50/264* | (2021.01) | |

(52) U.S. Cl.
CPC ............ *B60K 1/04* (2013.01); *H01M 50/204* (2021.01); *H01M 50/242* (2021.01); *H01M 50/264* (2021.01); *B60K 2001/0411* (2013.01); *H01M 2220/20* (2013.01)

(58) Field of Classification Search
CPC ............ B60K 1/04; B60K 2001/0411; H01M 50/204; H01M 50/242; H01M 50/264; H01M 50/249; B60R 16/04
See application file for complete search history.

(56) References Cited

U.S. PATENT DOCUMENTS

| | | | | |
|---|---|---|---|---|
| 6,367,646 B1 * | 4/2002 | Hoagland | ........... | H01M 50/267 206/703 |
| 10,183,637 B2 * | 1/2019 | Uraguchi | ............ | H01M 50/202 |
| 2011/0250485 A1 * | 10/2011 | Tsukuda | ............ | H01M 10/0481 429/153 |
| 2022/0416353 A1 * | 12/2022 | Hihara | ................ | H01M 50/204 |
| 2023/0142685 A1 * | 5/2023 | Nakamura | ............ | H01M 10/16 429/147 |

FOREIGN PATENT DOCUMENTS

| | | | | |
|---|---|---|---|---|
| JP | 2019014274 | | 1/2019 | |
| JP | 2019014274 A | * | 1/2019 | ............. B60R 16/04 |

* cited by examiner

*Primary Examiner* — James A Shriver, II
*Assistant Examiner* — Michael T. Walsh
(74) *Attorney, Agent, or Firm* — JCIPRNET

(57) ABSTRACT

A battery installation structure is configured to control a behavior of a battery when a vehicle collides, so that a front side frame is ensured to be provided with a sufficient stroke for collision. The battery installation structure is suitable for allowing a battery to be installed on a front side frame of a vehicle body. The battery installation structure includes an installation base disposed on the front side frame, a battery base, and a rear support leg. The battery base is disposed on the installation base to support the battery. The rear support leg is disposed at a rear end of the battery base. A center of the battery base is fixed to a fixing portion of the installation base, a lower end of the rear support leg is fixed to a rigid member of the vehicle body, and the lower end of the rear support leg is formed with a fragile portion.

14 Claims, 7 Drawing Sheets

BATTERY INSTALLATION STRUCTURE

CROSS-REFERENCE TO RELATED APPLICATION

This application claims the priority benefits of China application no. 202110343744.3, filed on Mar. 30, 2021. The entirety of the above-mentioned patent application is hereby incorporated by reference herein and made a part of this specification.

BACKGROUND

Technical Field

The disclosure relates to a battery installation structure, and in particular, relates to a battery installation structure applied in a vehicle.

Description of Related Art

In the related art, a battery may be mounted in a vehicle. The battery is supported through the battery base provided on the front side frame disposed at the front of the vehicle body and is fixed via the fixing member. For instance, Patent Literature 1 discloses a battery installation structure including a battery base. The front end of the battery base is fixed onto the installation base of the vehicle body, the rear end of the battery is fixed onto the rigid member of the vehicle body, so the battery is stably installed on the front side frame in this way. However, considering the impact of the engine type used in the vehicle on the overall layout, when a member installed in the engine chamber is provided behind the battery, how to ensure that the front side frame is provided with a sufficient stroke for collision when the vehicle collides is an important issue.

RELATED ART LITERATURE

Patent Literature

[Patent Literature 1] Japanese Patent Publication No. 2019-14274

SUMMARY

The disclosure provides a battery installation structure configured to control a behavior of a battery when a vehicle collides, so that a front side frame is ensured to be provided with a sufficient stroke for collision.

The disclosure provides a battery installation structure suitable for allowing a battery to be installed on a front side frame of a vehicle body. The battery installation structure includes an installation base, a battery base, and a rear support leg. The installation base is disposed on the front side frame. The battery base is disposed on the installation base to support the battery. The rear support leg is disposed at a rear end of the battery base. A center of the battery base is fixed to a fixing portion of the installation base, a lower end of the rear support leg is fixed to a rigid member of the vehicle body, and the lower end of the rear support leg is formed with a fragile portion.

In an embodiment of the disclosure, the battery base is provided with a rigid portion protruding towards the installation base.

In an embodiment of the disclosure, the rigid portion is disposed at an inner side of the front side frame in a vehicle width direction.

In an embodiment of the disclosure, the rigid portion is provided with an inclined portion inclined in a direction away from the fixing portion of the installation base.

In an embodiment of the disclosure, the inclined portion is provided with a groove portion aligned with a position of the fixing portion of the installation base in a vehicle front-and-rear direction.

In an embodiment of the disclosure, a center of gravity of the battery installed on the battery base is disposed on the groove portion in a plan view, and a fixing member for fixing the battery corresponds to the center of gravity of the battery in a plan view.

In an embodiment of the disclosure, the fixing member corresponds to the fixing portion of the installation base in a plan view.

In an embodiment of the disclosure, the rear support leg is combined at a position closer to an outer side of the vehicle width direction than the front side frame.

In an embodiment of the disclosure, an engine installation member positioned opposite to the battery base in a vehicle front-and-rear direction is inclined with respect to the battery base.

In an embodiment of the disclosure, the battery installation structure further includes a front support leg. The front support leg is disposed at a front end of the battery base, and the front support leg is inclined towards the front side frame from an inner side of the vehicle width direction.

In an embodiment of the disclosure, the front support leg is inclined towards a rear direction of a vehicle front-and-rear direction.

In an embodiment of the disclosure, the rear support leg is inclined towards the rigid member from an inner side of the vehicle width direction of the battery base.

In an embodiment of the disclosure, a cross section of the rear supporting leg is L-shaped, and the fragile portion is formed by a defective portion at the lower end of the rear support leg bent towards the rigid member.

In an embodiment of the disclosure, the rear support leg is provided with an overlapping portion formed by the lower end of the rear support leg bent towards the rigid member.

To sum up, in the battery installation structure provided by the disclosure, the installation base is disposed on the front side frame, the battery base is disposed on the installation base to support the battery, and the rear support leg is disposed at the rear end of the battery base. The center of the battery base is fixed to the fixing portion of the installation base, the lower end of the rear support leg is fixed to the rigid member of the vehicle body, and the lower end of the rear support leg is formed with the fragile portion. In this way, when the vehicle collides so that the front side frame deforms backwards and upwards starting from the curved portion thereof for collision, the battery base and the installation base move together to damage the fragile portion of the rear support leg, so that the battery base moves backwards and upwards and thus may be misaligned with the engine installation member. Therefore, the battery installation structure provided by the disclosure may control the behavior of the battery when the vehicle collides, so that the front side frame is ensured to be provided with a sufficient stroke for collision.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
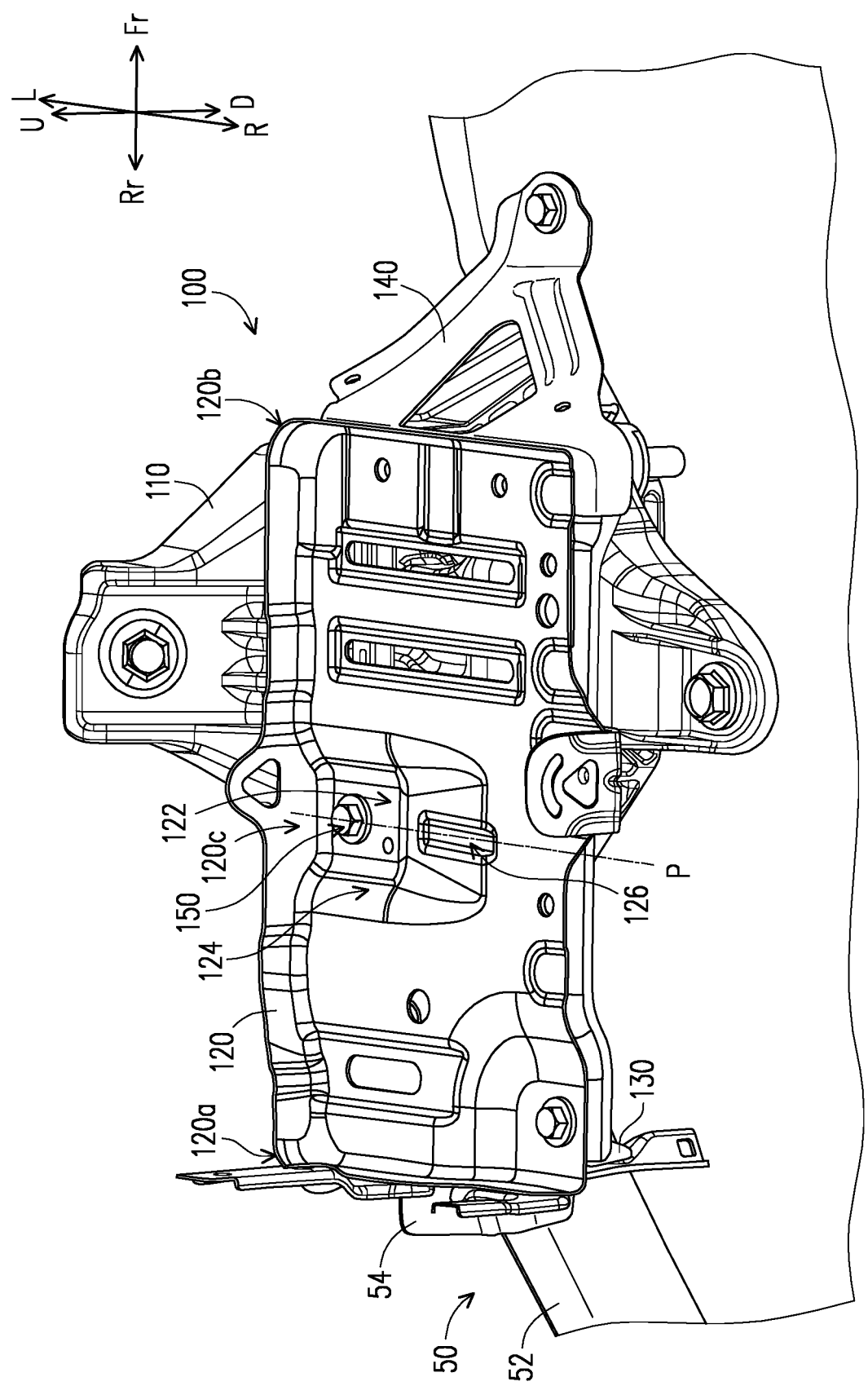
FIG. 1 is a schematic three-dimensional view of a battery installation structure according to an embodiment of the disclosure.
Figure 2:
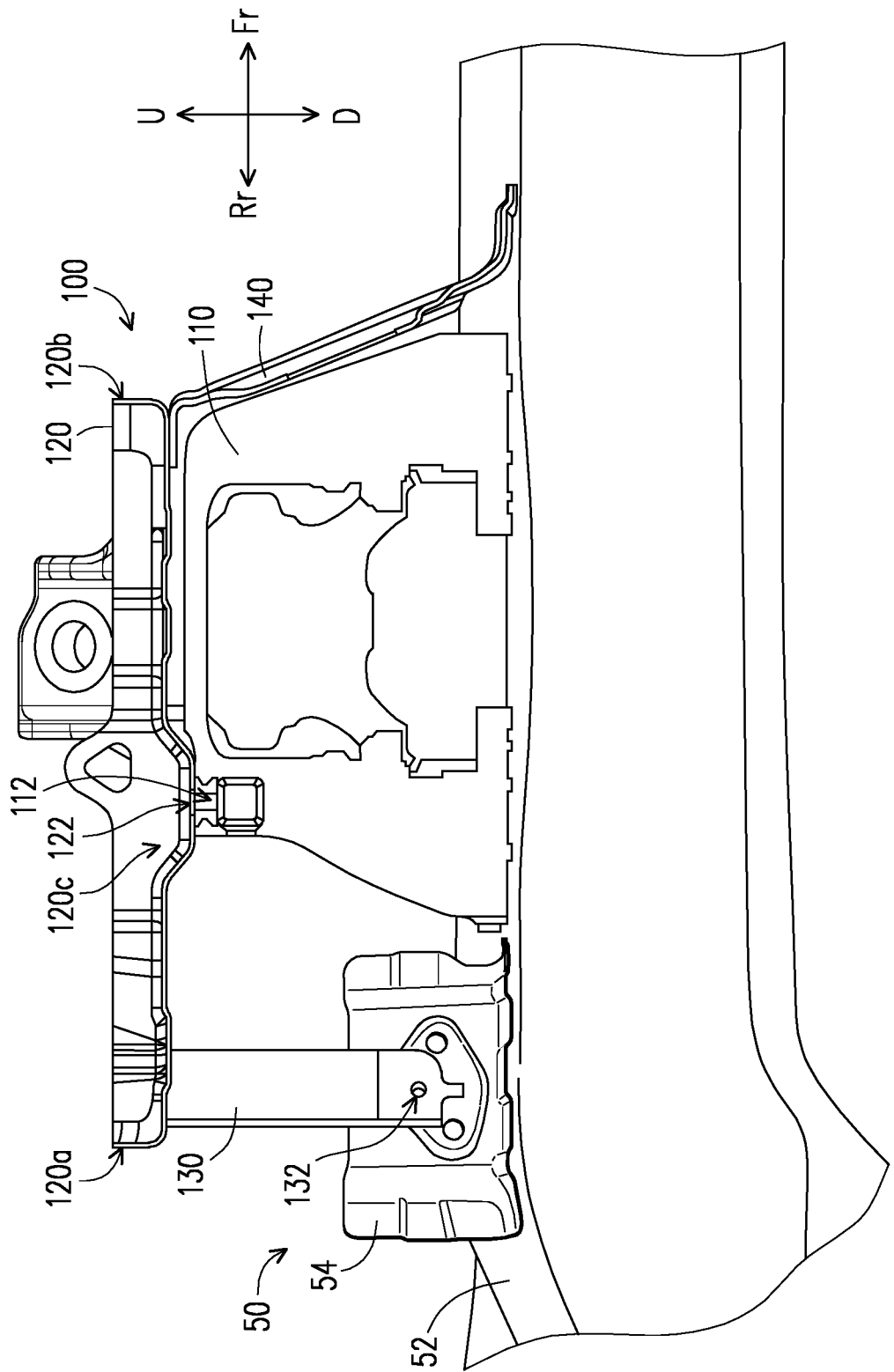
FIG. 2 is a schematic side view of the battery installation structure shown in FIG. 1.
Figure 3:
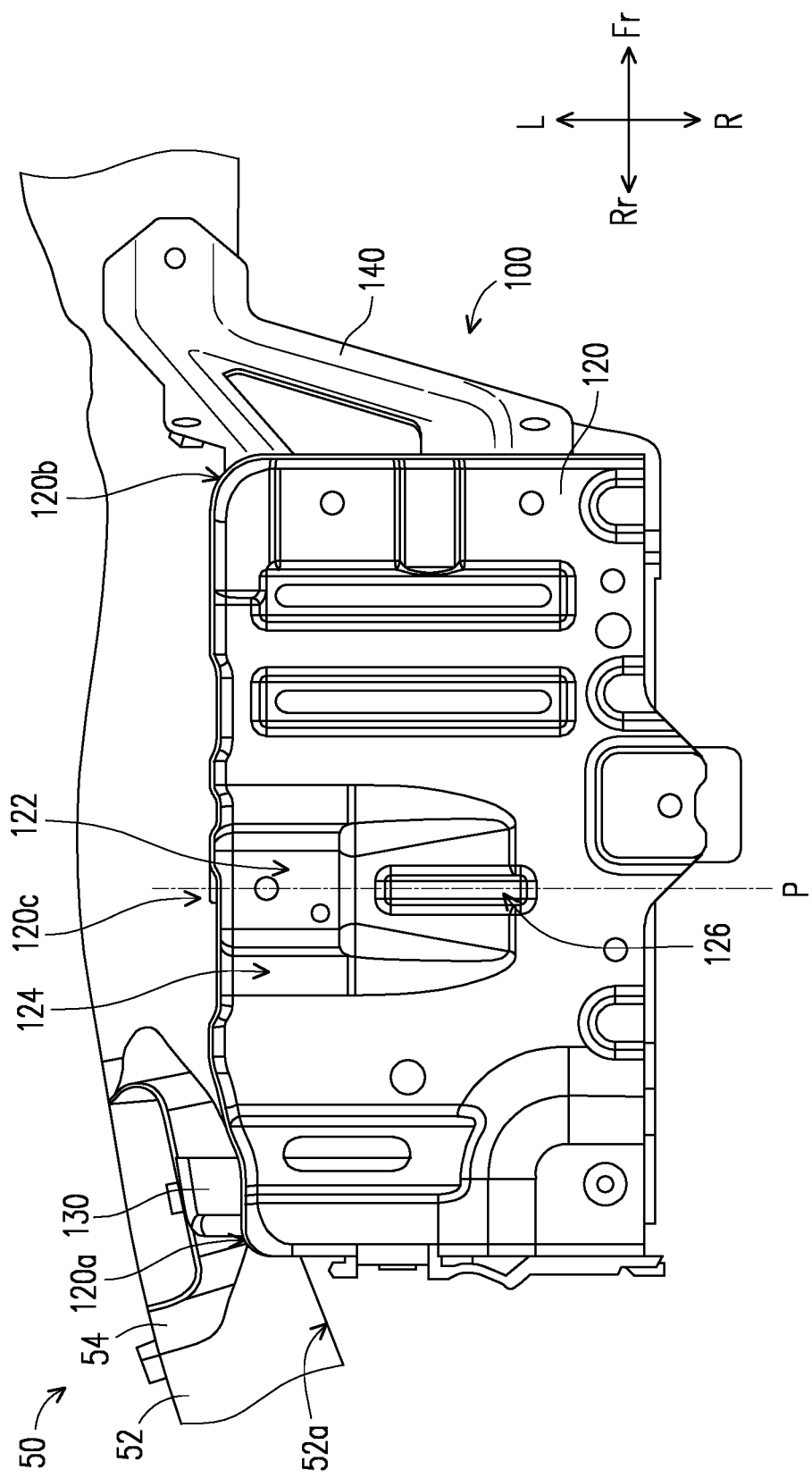
FIG. 3 is a schematic top view of the battery installation structure shown in FIG. 1.
Figure 4:
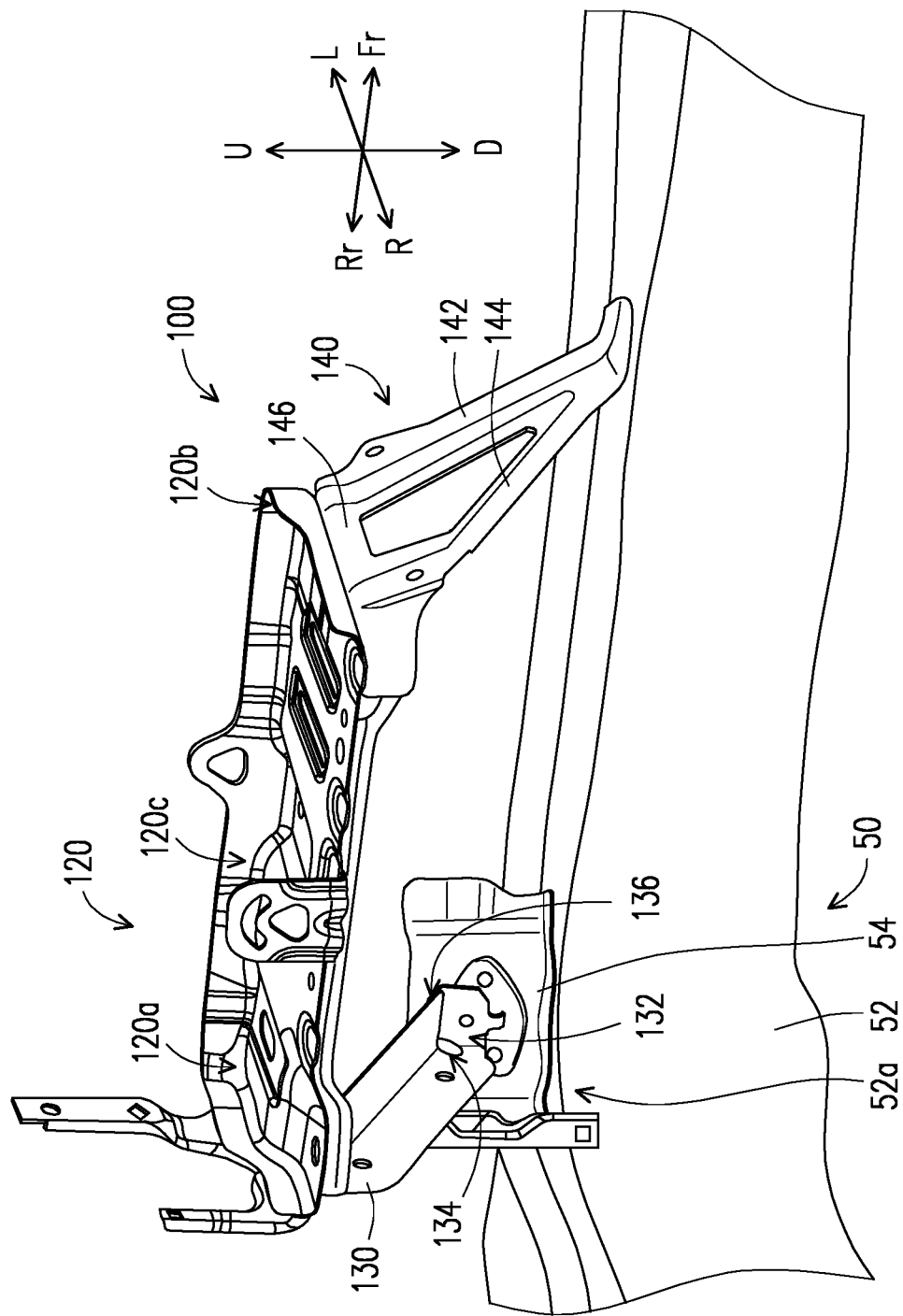
FIG. 4 is a schematic three-dimensional view of the battery installation structure shown in FIG. 1 from another angle of view.
Figure 6:
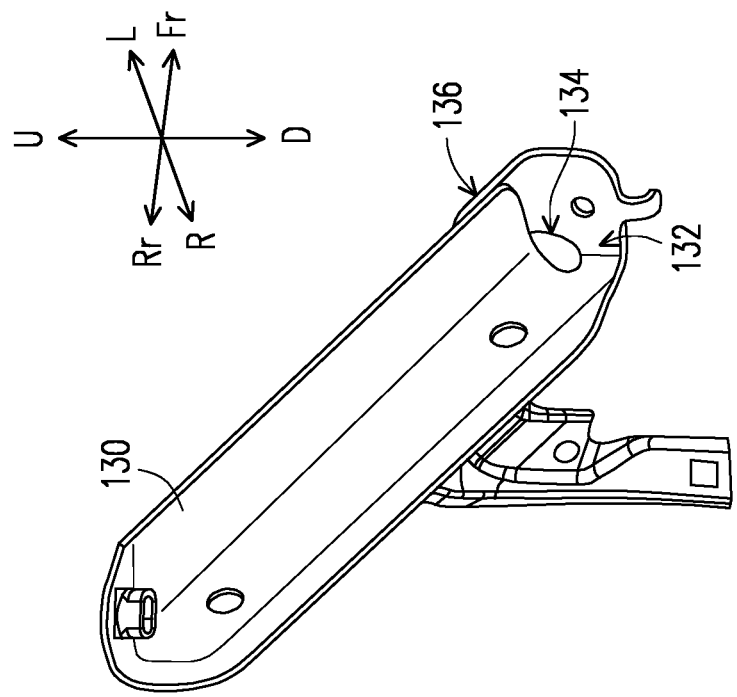
FIG. 6 is a schematic three-dimensional view of a rear support leg of the battery installation structure shown in FIG. 4.
Figure 5:
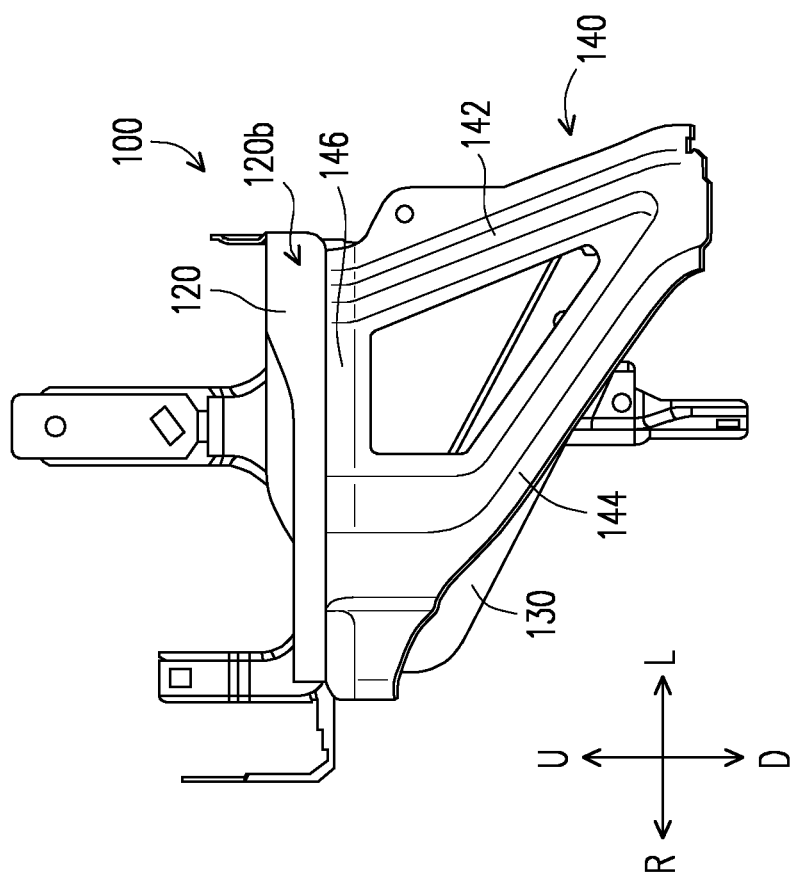
FIG. 5 is a schematic front view of the battery installation structure shown in FIG. 4.
Figure 7:
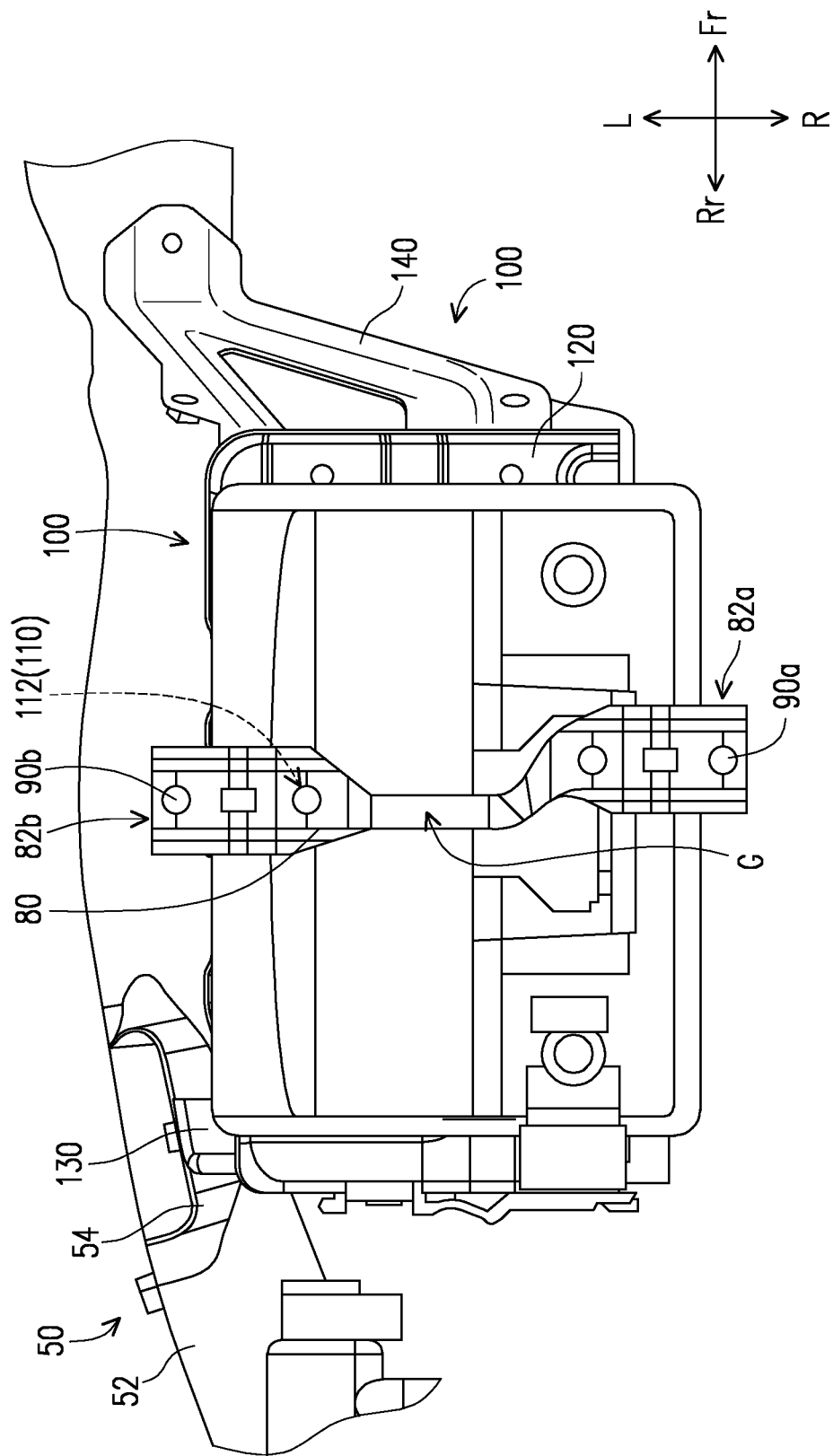
FIG. 7 is a schematic top view of the battery installation structure shown in FIG. 1 applied in a vehicle body.
Figure 8:
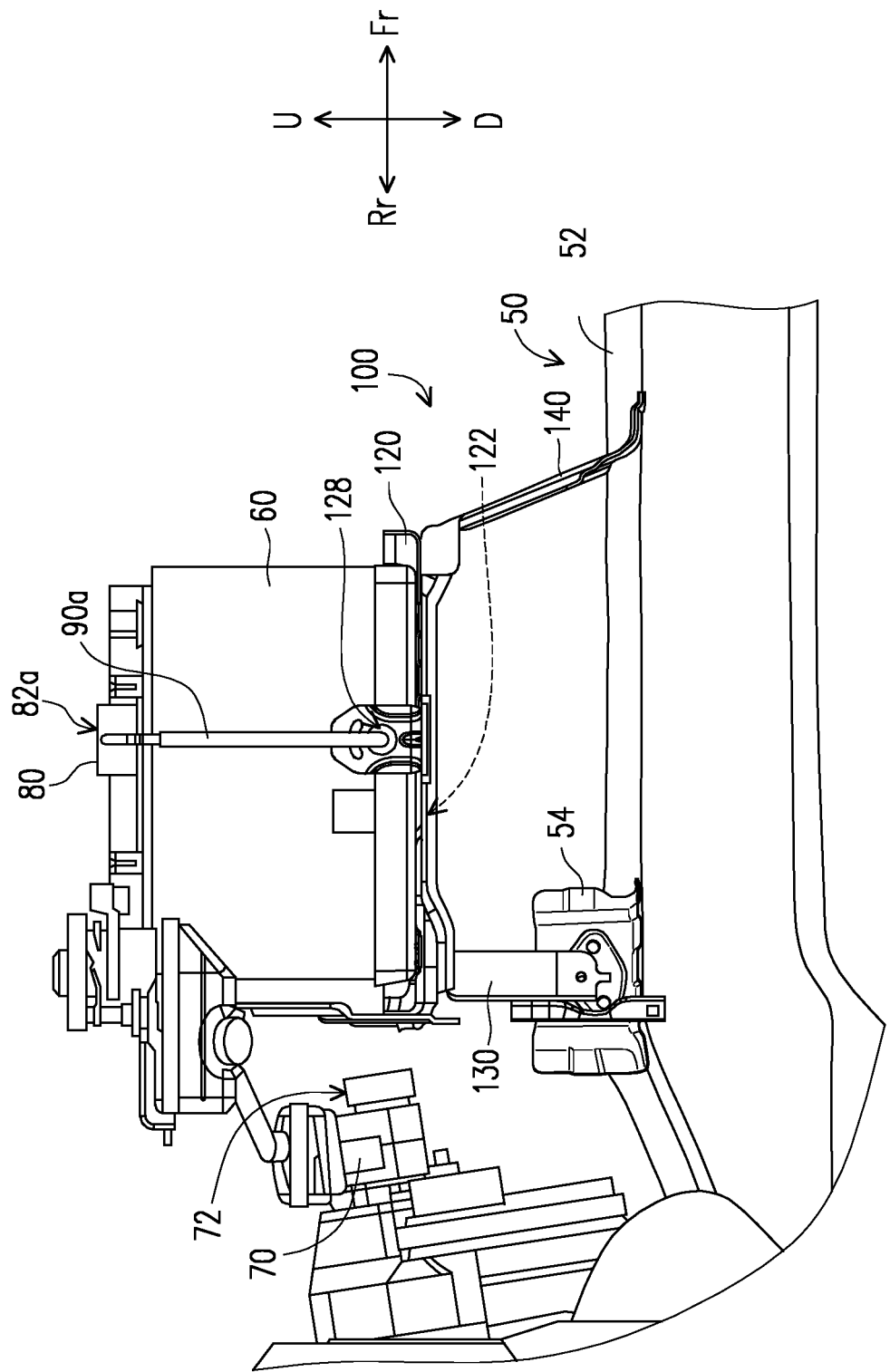
FIG. 8 is a schematic side view of the battery installation structure shown in FIG. 7 applied in the vehicle body.

Description of the disclosure is given with reference to the exemplary embodiments illustrated by the accompanying drawings. FIG. 1 is a schematic three-dimensional view of a battery installation structure according to an embodiment of the disclosure. FIG. 2 is a schematic side view of the battery installation structure shown in FIG. 1. FIG. 3 is a schematic top view of the battery installation structure shown in FIG. 1. FIG. 4 is a schematic three-dimensional view of the battery installation structure shown in FIG. 1 from another angle of view. FIG. 5 is a schematic front view of the battery installation structure shown in FIG. 4. FIG. 6 is a schematic three-dimensional view of a rear support leg of the battery installation structure shown in FIG. 4. FIG. 7 is a schematic top view of the battery installation structure shown in FIG. 1 applied in a vehicle body. FIG. 8 is a schematic side view of the battery installation structure shown in FIG. 7 applied in the vehicle body. Hereinafter, the purpose, installation position, and specific structure of a battery installation structure 100 of this embodiment are be described together with FIG. 1 to FIG. 8. However, the battery installation structure 100 of this embodiment is only an example of the disclosure, and the disclosure is not limited thereto.

First, with reference to FIG. 1 to FIG. 3, herein, for ease of description of the specific structure of the battery installation structure 100, FIG. 1 and FIG. 2 illustrate the entire battery installation structure 100 and FIG. 3 omits to illustrate part of the battery installation structure 100 (e.g., an installation base). In this embodiment, the battery installation structure 100 is disposed on a front side frame 52 of a vehicle body 50 and is suitable for allowing a battery (to be described in following paragraphs) to be installed on the front side frame 52 of the vehicle body 50. The battery installation structure 100 includes members such as an installation base 110, a battery base 120, a rear support leg 130, and a front support leg 140 which acts as installation members. The installation base 110 is disposed on the front side frame 52 of the vehicle body 50. The battery base is disposed on the installation base 110 to support the battery, the rear support leg 130 is disposed at a rear end 120a of the battery base 120, and the front support leg 140 is disposed at a front end 120b of the battery base 120. Herein, a center 120c of the battery base 120 is fixed to a fixing portion 112 of the installation base 110. A lower end of the front support leg 140 is fixed to the front side frame 52 of the vehicle body 50, a lower end of the rear support leg 130 is fixed to a rigid member 54 (shown in FIG. 2) of the vehicle body 50, and the lower end of the rear support leg 130 is formed with a fragile portion 132 (shown in FIG. 2).

Herein, the front side frame 52 is a frame structure connected to a portion of the vehicle body 50, such as a vehicle body front structure (not shown) and extending in a vehicle front-and-rear direction (i.e., a vehicle front direction Fr and a vehicle rear direction Rr). Further, the rigid member 54 is a reinforcing structure provided in the vicinity of the front side frame 52, but the disclosure is not limited thereto. Herein, the installation base 110 is disposed on the front side frame 52 and is installed above the front side frame 52 in a vehicle up-and-down direction (i.e., a vehicle up direction U and a vehicle down direction D), for example. Similarly, the battery base 120 is disposed on the installation base 110 and is disposed above the installation base 110 in the vehicle up-and-down direction, for example. Further, the rear end 120a of the battery base 120 refers to an end of the battery base 120 corresponding to the vehicle rear direction Rr. The front end 120b of the battery base 120 refers to an end of the battery base 120 corresponding to the vehicle front direction Fr. The center 120c of the battery base 120 refers to the portion between the rear end 120a and the front end 120b of the battery base 120 and is not limited to the exact center of the battery base 120. Thus, the battery (to be described in following paragraphs) supported via the battery installation structure 100 is also disposed above the front side frame 52 of the vehicle body 50.

That is, in this embodiment, the rear end 120a and the front end 120b of the battery base 120 are connected to the rigid member 54 and the front side frame 52 of the vehicle body 50 via the rear support leg 130 and the front support leg 140. Further, the center 120c of the battery base 120 is fixed to the fixing portion 112 of the installation base 110, so that the battery installation structure 100 is stably installed on the front side frame 52. In this way, when a vehicle collides so that the front side frame 52 deforms backwards (i.e., the vehicle rear direction Rr) and upwards (i.e., the vehicle up direction U) starting from a curved portion thereof for collision, the battery base 120 and the installation base 110 move backwards and upwards together to damage the fragile portion 132 of the rear support leg 130, causing the fragile portion 132 of the rear support leg 130 to break. As such, even if a member installed in an engine chamber is provided behind the battery, the battery base 120 may easily move backwards and upwards by damaging the fragile portion 132 of the rear support leg 130 when the vehicle collides, so that the battery base 120 may be misaligned with an engine installation member (description of the battery and the engine installation member is provided in following paragraphs). Accordingly, the battery installation structure 100 may control a behavior of the battery when the vehicle collides, so that the front side frame 52 is ensured to be provided with a sufficient stroke for collision.

Regarding the fixing manner of the installation base 110 and the battery base 120, description is further provided as follows. In this embodiment, as shown in FIG. 1 to FIG. 3, the battery base 120 is provided with a rigid portion 122 protruding towards the installation base 110. The rigid portion 122 is disposed at an inner side of the front side frame 52 in a vehicle width direction (e.g., a side of the front side frame 52 corresponding to a vehicle right direction R shown in FIG. 3). That is, the rigid portion 122 and the front side frame 52 are misaligned in the vehicle width direction (i.e., a vehicle left direction L and the vehicle right direction R). Preferably, the rigid portion 122 is formed by a portion of the battery base 120 that is recessed from the vehicle up direction U to the vehicle down direction D and protrudes towards the installation base 110, but it is not limited thereto. Further, the rigid portion 122 is located at the center 120c of the battery base 120, so that the rigid portion 122 is fixed to the fixing portion 112 of the installation base 110 together with the center 120c of the battery base 120. For instance, from the vehicle up direction U to the vehicle down direction D, the fixing member 150 such as a bolt is inserted into the rigid portion 122 located at the center 120c of the battery base 120 and the fixing portion 112 of the installation base 110 for fixing, but the disclosure is not limited thereto.

Therefore, in this embodiment, the battery base 120 closely abuts against the installation base 110 via the rigid portion 122 protruding towards the installation base 110. As such, when the vehicle collides, the installation base 110 may push the rigid portion 122 protruding towards the installation base 110 so as to easily push the battery base 120 to move together. Further, the battery base 120 may move backwards and upwards easily because the rigid portion 122 and the front side frame 52 are misaligned in the vehicle width direction. As such, the battery base 120 may easily damage the fragile portion 132 of the rear support leg 130, causing the fragile portion 132 of the rear support leg 130 to break. Besides, since the rigid portion 122 is formed as a recess, the rigid portion 122 may accommodate the fixing member 150 such as a bolt for fixing the rigid portion 122 located at the center 120c of the battery base 120 and the fixing portion 112 of the installation base 110 and may suppress interference between the fixing member 150 and the battery (to be described in following paragraphs) to stably fix the battery. However, the abovementioned structures of the installation base 110 and the battery base 120 are not particularly limited in the disclosure, and the structures may be adjusted according to needs.

Further, in this embodiment, as shown in FIG. 1 to FIG. 3, the rigid portion 122 is provided with an inclined portion 124 inclined in a direction away from the fixing portion 112 of the installation base 110. To be specific, the direction away from the fixing portion 112 of the installation base 110 is equivalent to a direction away from the rigid portion 122 located at the center 120c of the battery base 120. Therefore, the inclined portion 124 refers to an inclined wall surface formed by extending the rigid portion 122 formed as a recess to the surrounding (e.g., the vehicle front direction Fr, the vehicle rear direction Rr, the vehicle right direction R, etc.). In this way, when the rigid portion 122 is formed at the center 120c of the battery base 120, the inclined portion 124 is formed around the rigid portion 122, wrinkles may be suppressed, and the rigid portion 122 may be formed easily. However, the abovementioned structure of the battery base 120 is not particularly limited in the disclosure, and the structure may be adjusted according to needs.

Furthermore, in this embodiment, as shown in FIG. 1 to FIG. 3, the inclined portion 124 is provided with a groove portion 126 aligned with a position of the fixing portion 112 of the installation base 110 in the vehicle front-and-rear direction. To be specific, the groove portion 126 is disposed on a position (a position line P shown in FIG. 1 and FIG. 3) on the inclined portion 124 aligned with the position of the fixing portion 112 (equivalent to the fixing member 150) of the installation base 110. The abovementioned alignment includes substantially the same but allows a slight misalignment in the front and rear, but is not limited thereto. As the groove portion 126 is provided in the inclined portion 124, the inclined portion 124 may be reinforced and deformation may be suppressed. In this way, when the vehicle collides, the fragile portion 132 of the rear support leg 130 may be easily damaged, causing the fragile portion 132 of the rear support leg 130 to break. However, the abovementioned structure of the battery base 120 is not particularly limited in the disclosure, and the structure may be adjusted according to needs.

Description of the specific structure of the front support leg 140 is further provided as follows. With reference to FIG. 4 and FIG. 5, herein, for ease of description of the specific structure of the battery installation structure 100, FIG. 4 and FIG. 5 omit to illustrate part of the battery installation structure 100 (e.g., the installation base 110). In this embodiment, as shown in FIG. 4 and FIG. 5, the front support leg 140 is inclined towards the front side frame 52 from an inner side of the vehicle width direction (e.g., a side corresponding to the vehicle right direction R), and the front support leg 140 is inclined towards the rear direction (i.e., the vehicle rear direction Rr) of the vehicle front-and-rear direction. To be specific, the front support leg 140 has a first support portion 142 obliquely extending from an end portion of the front end 120b of the battery base 120 corresponding to the vehicle left direction L towards the front side frame 52 from top to bottom and from rear to front, a second support portion 144 obliquely extending from an end portion of the front end 120b of the battery base 120 corresponding to the vehicle right direction R towards the front side frame 52 from top to bottom and from rear to front, and a third support portion 146 laterally connecting end portions of the first support portion 142 and the second support portion 144 corresponding to the vehicle up direction U. Accordingly, a substantially triangular bracket that is inclined towards the front side frame 52 from the inner side of the vehicle width direction and inclined towards the rear direction of the vehicle front-and-rear direction is formed. However, in other embodiments that are not shown, a single plate may also be adopted for the front support leg 140, or a more complicated structure may also be adopted to form inclination in the vehicle width direction and in the vehicle front-and-rear direction.

That is, in this embodiment, the front support leg 140 is inclined in the vehicle width direction and in the vehicle front-and-rear direction. The front end 120b of the battery base 120 is connected to the third support portion 146 of the front support leg 140 and is supported obliquely via the first support portion 142 and the second support portion 144 of the front support leg 140. Therefore, even if the battery base 120 is misaligned with the installation base 110, the battery base 120 may still be reliably supported on the front side frame 52 through the inclined front support leg 140. Besides, since the front support leg 140 is obliquely provided on the front side frame 52, the front support leg 140 exhibits high rigidity in a pulling direction (e.g., the vehicle up direction U) and in a pressing direction (e.g., the vehicle down direction D). However, the abovementioned structure of the front support leg 140 is not particularly limited in the disclosure, and the structure may be adjusted according to needs.

Description of the specific structure of the rear support leg 130 is further provided as follows. In this embodiment, as shown in FIG. 3 to FIG. 5, the rear support leg 130 is inclined towards the rigid member 54 from the inner side of the vehicle width direction (e.g., the side corresponding to the vehicle right direction R) of the battery base 120, and the rear support leg 130 is combined at a position closer to an outer side of the vehicle width direction (e.g., a side corresponding to the vehicle left direction L) than the front side frame 52. To be specific, the rear support leg 130 obliquely extends from an end portion of the rear end 120a of the battery base 120 corresponding to the vehicle right direction R towards the front side frame 52 and the rigid member 54 (as shown in FIG. 4) disposed above the front side frame 52 from top to bottom. Accordingly, a substantially bar-shaped bracket inclined towards the front side frame 52 and the rigid member 54 from the inner side of the vehicle width direction is formed. Further, since the rigid member 54 is disposed above the front side frame 52 and is located on a ridge line 52a of the front side frame 52 at the outer side of the vehicle width direction (e.g., the side corresponding to the vehicle left direction L), the rear support leg 130 inclined towards the rigid member 54 is combined with the rigid member 54 at a position closer to the outer side of the vehicle width direction than the front side frame 52.

That is, in this embodiment, the rear support leg 130 is inclined in the vehicle width direction and is connected to the outer side (e.g., the side corresponding to the vehicle left direction L) of the front side frame 52 in the vehicle width direction through the rigid member 54. Accordingly, the rear end 120a of the battery base 120 may be supported in the vehicle width direction via the rear support leg 130. Further, even if the vehicle collides and the front side frame 52 is deformed backwards and upwards, the battery base 120 may not interfere with the rear support leg 130 and may thus maintain its connection with the rigid member 54 through the rear support leg 130. However, the abovementioned structure of the rear support leg 130 is not particularly limited in the disclosure, and the structure may be adjusted according to needs.

Further, with reference to FIG. 0.4 and FIG. 6, herein, with ease of description of the specific structure of the rear support leg 130, FIG. 6 illustrates only the rear support leg 130 of the battery installation structure 100. In this embodiment, a cross section of the rear supporting leg 130 is L-shaped, and the fragile portion 132 is formed by a defective portion 134 at the lower end of the rear support leg 130 bent towards the rigid member 54. Further, the rear support leg 130 is provided with an overlapping portion 136 formed by the lower end of the rear support leg 130 bent towards the rigid member 54. To be specific, the rear support leg 130 may be a bar-shaped bracket with a substantially L-shaped cross section, and a notch is formed at the lower end (that is, one end corresponding to the vehicle down direction D) of the rear support leg 130 to act as the defective portion 134. As such, the rear support leg 130 may be bent towards the rigid member 54 with the notched defect portion 134 acting as a bending point, and since a bent portion of the rear support leg 130 is close to the defective portion 134 and is bent, strength of the bent portion is low and forms the fragile portion 132. Moreover, since the cross section of the rear support leg 130 is L-shaped, portions of the rear support leg 130 at opposite sides close to the defective portion 134 overlap each other at the bending position, so the overlapping portion 136 bent towards the rigid member 54 is accordingly formed.

That is, in this embodiment, the rear support leg 130 is inclined in the vehicle width direction and is fixed at the inner side of the vehicle width direction (e.g., the side corresponding to the vehicle left direction L) through the rigid member 54. Therefore, a notch is provided at the lower end to act as the defective portion 134 to lower the strength in the pulling direction (e.g., the vehicle up direction U). In this way, when the vehicle collides, the fragile portion 132 of the rear support leg 130 may be easily damaged, causing the fragile portion 132 of the rear support leg 130 to break. Further, the overlapping portion 136 is provided at the lower end to increase the strength in the pressing direction (e.g., the vehicle down direction D), so that the rear support leg 130 may stably support the battery base 120. However, the abovementioned structure of the rear support leg 130 is not particularly limited in the disclosure, and the structure may be adjusted according to needs. For instance, the overlapping portion 136 may also be bonded through welding or through a bonding agent.

Description of the application of the battery installation structure 100 in the vehicle body 50 for installation of a battery 60 is further provided as follows. With reference to FIG. 7 and FIG. 8, herein, FIG. 7 illustrates a relative relationship between the battery installation structure 100 and the battery 60 in the vehicle body 50, and FIG. 8 illustrates relative relationships among the battery installation structure 100, the battery 60, and an engine installation member 70 in the vehicle body 50. In addition, for ease of description of the specific structure of the battery installation structure 100, FIG. 7 and FIG. 8 omit to illustrate part of the battery installation structure 100 (e.g., the installation base 110).

In this embodiment, as shown in FIG. 7 and FIG. 8, the battery 60 is disposed above the front side frame 52 of the vehicle body 50 through the battery installation structure 100 and is fixed through the fixing member 80. Herein, an end portion 82a of the fixing member 80 corresponding to the inner side of the vehicle width direction (e.g., the side of the vehicle right direction R) is connected to an installation portion 128 of the battery base 120 corresponding to the inner side of the vehicle width direction through a connecting member 90a (e.g., an inserted rod). Further, an end portion 82b of the fixing member 80 corresponding to the outer side of the vehicle width direction (e.g., the side of the vehicle left direction L) is connected to an installation portion (not shown) of the battery base 120 corresponding to the outer side of the vehicle width direction through a connecting member 90b, and the battery 60 is fixed to the battery base 120 in this way.

Further, in this embodiment, as shown in FIG. 7, a center of gravity G of the battery 60 installed on the battery base 120 is disposed on the groove portion 126 of the battery base 120 in a plan view (shown in FIG. 1 and FIG. 3). To be specific, the center of gravity G of the battery 60 is located at a center of the battery 60, for example, and therefore corresponds to the center 120c of the battery base 120. As such, the groove portion 126 disposed on the battery base 120 to reinforce the inclined portion 124 as mentioned above is also provided in the center 120c of the battery base 120, so that the groove portion 126 may correspond to the center of gravity G of the battery 60 installed on the battery base 120. Therefore, even though the center of gravity G of the battery 60 and the rigid portion 122 as well as the fixing portion 112 exhibiting high strength are misaligned, the battery 60 may be stably supported by the groove portion 126 providing a reinforcing function in correspondence with the center of gravity G of the battery 60.

Further, in this embodiment, as shown in FIG. 7, the fixing member 80 fixing the battery 60 corresponds to the center of gravity G of the battery 60 in the plan view, and the fixing member 80 corresponds to the fixing portion 112 of the installation base 110 in the plan view (shown in FIG. 1 and FIG. 3). To be specific, the battery 60 is fixed onto the battery installation structure 100 through the fixing member 80. The fixing member 80 is connected to two opposite sides of the battery base 120 and thereby crosses two opposite sides of the battery 60 to fix the battery 60 to the battery base 120. Therefore, the installation portion (e.g., the installation portion 128) of the battery base 120 is arranged to correspond to the center 120c of the battery base 120, so the fixing member 80 connected to the installation portion of the battery base 120 to fix the battery 60 is arranged to pass through the center 120c of the battery base 120, and preferably is arranged to correspond to the center of gravity G of the battery 60 in the plan view. As the fixing portion 112 of the installation base 110 corresponds to the rigid portion 122 located at the center 120c of the battery base 120, the fixing member 80 thereby corresponds to the fixing portion 112 disposed on the installation base 110 in the plan view. In this way, the fixing member 80 corresponding to the center of gravity G of the battery 60 and corresponding to the fixing portion 112 of the installation base 110 may stably support the battery 60, that is, the battery 60 is stably fixed to the battery base 120. However, the relative relationship between the battery installation structure 100 and the battery 60 in the vehicle body 50 is not particularly limited in the disclosure, and the relative relationship may be adjusted according to needs.

Further, in this embodiment, as shown in FIG. 8, the engine installation member 70 positioned opposite to the battery base 120 in the vehicle front-and-rear direction is inclined with respect to the battery base 120. To be specific, the engine installation member 70 is a member installed in the engine chamber, such as a braking member, but it is not limited thereto. The engine installation member 70 is usually arranged behind the battery 60 installed on the battery installation structure 100, so that the position of the engine installation member 70 in the vehicle rear direction Rr of the vehicle front-and-rear direction faces the battery base 120 in the vehicle front direction Fr. Furthermore, the engine installation member 70 is inclined with respect to the battery base 120, for example, is inclined towards the vehicle up direction U, so that a top portion 72 of the engine installation member 70 is higher than the rigid portion 122 of the battery base 120.

Therefore, in this embodiment, when the vehicle collides, as the rigid portion 122 is pushed by the installation base 110, the battery base 120 may easily move backwards and upwards and may thereby be misaligned with the obliquely-arranged engine installation member 70. Accordingly, the battery installation structure 100 may control the behavior of the battery 60 when the vehicle collides, so that the front side frame 52 is ensured to be provided with a sufficient stroke for collision. However, the relative relationship between the battery installation structure 100 and the engine installation member 70 in the vehicle body 50 is not particularly limited in the disclosure, and the relative relationship may be adjusted according to needs.

In view of the foregoing, in the battery installation structure provided by the disclosure, the installation base is disposed on the front side frame, the battery base is disposed on the installation base to support the battery, and the rear support leg is disposed at the rear end of the battery base. The center of the battery base is fixed to the fixing portion of the installation base, the lower end of the rear support leg is fixed to the rigid member of the vehicle body, and the lower end of the rear support leg is formed with the fragile portion. Preferably, the front end of the battery base is provided with the front support leg. The rear support leg is combined at a position closer to the outer side of the vehicle width direction than the front side frame. The front support leg is inclined towards the front side frame from the inner side of the vehicle width direction. The engine installation member positioned opposite to the battery base in the vehicle front-and-rear direction is inclined with respect to the battery base. In this way, when the vehicle collides so that the front side frame deforms backwards and upwards starting from the curved portion thereof for collision, the battery base and the installation base move together to damage the fragile portion of the rear support leg, so that the battery base moves backwards and upwards and thus may be misaligned with the engine installation member. Therefore, the battery installation structure provided by the disclosure may control the behavior of the battery when the vehicle collides, so that the front side frame is ensured to be provided with a sufficient stroke for collision.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A battery installation structure, suitable for allowing a battery to be installed on a front side frame of a vehicle body, the battery installation structure comprising:
    an installation base, disposed on the front side frame;
    a battery base, disposed on the installation base to support the battery; and
    a rear support leg, disposed at a rear end of the battery base, wherein
    a center of the battery base is directly fixed to a fixing portion of the installation base, a lower end of the rear support leg is fixed to a rigid member of the vehicle body, and the lower end of the rear support leg is formed with a fragile portion.

2. The battery installation structure according to claim 1, wherein the battery base is provided with a rigid portion protruding towards the installation base.

3. The battery installation structure according to claim 2, wherein the rigid portion is disposed at an inner side of the front side frame in a vehicle width direction.

4. The battery installation structure according to claim 2, wherein the rigid portion is provided with an inclined portion inclined in a direction away from the fixing portion of the installation base.

5. The battery installation structure according to claim 4, wherein the inclined portion is provided with a groove portion aligned with a position of the fixing portion of the installation base in a vehicle front-and-rear direction.

6. The battery installation structure according to claim 5, wherein a center of gravity of the battery installed on the battery base is disposed on the groove portion in a plan view, and a fixing member for fixing the battery corresponds to the center of gravity of the battery in a plan view.

7. The battery installation structure according to claim 6, wherein the fixing member corresponds to the fixing portion of the installation base in a plan view.

8. The battery installation structure according to claim 1, wherein the rear support leg is combined at a position closer to an outer side of a vehicle width direction than the front side frame.

9. The battery installation structure according to claim 1, wherein an engine installation member positioned opposite to the battery base in a vehicle front-and-rear direction is inclined with respect to the battery base.

10. The battery installation structure according to claim 1, further comprising a front support leg, the front support leg is disposed at a front end of the battery base, and the front support leg is inclined towards the front side frame from an inner side of a vehicle width direction.

11. The battery installation structure according to claim 10, wherein the front support leg is inclined towards a rear direction of a vehicle front-and-rear direction.

12. The battery installation structure according to claim 1, wherein the rear support leg is inclined towards the rigid member from an inner side of a vehicle width direction of the battery base.

13. The battery installation structure according to claim 1, wherein a cross section of the rear supporting leg is L-shaped, and the fragile portion is formed by a defective portion at the lower end of the rear support leg bent towards the rigid member.

14. The battery installation structure according to claim 13, wherein the rear support leg is provided with an overlapping portion formed by the lower end of the rear support leg bent towards the rigid member.

* * * * *